(12) United States Patent
Giuliani et al.

(10) Patent No.: US 10,560,000 B2
(45) Date of Patent: *Feb. 11, 2020

(54) ELECTRIC MOTOR HAVING A TANGENTIAL ARCHITECTURE WITH IMPROVED AIR COOLING

(71) Applicant: MAGNETI MARELLI S.P.A., Corbetta (IT)

(72) Inventors: Patrick Giuliani, Corbetta (IT); Francesco Leli, Corbetta (IT); Marzio Lettich, Corbetta (IT); Matteo Cataldi, Corbetta (IT)

(73) Assignee: MAGNETI MARELLI S.P.A., Corbetta (IT)

( * ) Notice: Subject to any disclaimer, the term of this patent is extended or adjusted under 35 U.S.C. 154(b) by 160 days.

This patent is subject to a terminal disclaimer.

(21) Appl. No.: 15/602,633

(22) Filed: May 23, 2017

(65) Prior Publication Data

US 2017/0346368 A1    Nov. 30, 2017

(30) Foreign Application Priority Data

May 30, 2016  (IT) .................. 102016000055647

(51) Int. Cl.
| | | |
|---|---|---|
| *H02K 9/06* | (2006.01) | |
| *H02K 5/04* | (2006.01) | |
| *H02K 9/14* | (2006.01) | |

(52) U.S. Cl.
CPC ............... *H02K 9/06* (2013.01); *H02K 5/04* (2013.01); *H02K 9/14* (2013.01)

(58) Field of Classification Search
CPC .............................................. H02K 9/02–9/06
See application file for complete search history.

(56) References Cited

U.S. PATENT DOCUMENTS

| 2012/0062057 A1 | 3/2012 | Nagayama et al. |
| 2013/0167826 A1* | 7/2013 | Feld ................ F04D 25/082 |
| | | 126/299 D |

(Continued)

FOREIGN PATENT DOCUMENTS

| DE | 102005032968 A1 | 2/2007 |
| DE | 102014225588 A1 | 6/2015 |

(Continued)

OTHER PUBLICATIONS

Italian Search Report dated Jan. 9, 2017 for Italian Patent Application No. UA20163925 (7 pages).

(Continued)

*Primary Examiner* — Ramon M Barrera
(74) *Attorney, Agent, or Firm* — Howard & Howard Attorneys PLLC (57) ABSTRACT

An electric motor including a rotor, rotating about an axis of rotation, and a stator, coaxial to the rotor. The stator has a casing. A body incorporates a controller of the electric motor. The body is placed outside the stator and parallel to the axis of rotation in a position substantially tangent to the casing of the stator. The rotor includes a first and second cooling fan, keyed on respective first and second axial ends of the rotor, opposite along the axis of rotation. The first and second cooling fans generate respectively, with the rotation of the rotor, a first and a second flow of cooling air independent of each other. The first flow of cooling air is directed toward the first axial end of the rotor, and the second flow of cooling air is directed towards the body so as to cool down the controller.

15 Claims, 6 Drawing Sheets

FIG.1

(56) References Cited

U.S. PATENT DOCUMENTS

2013/0315692 A1 11/2013 Hsiung
2017/0346366 A1* 11/2017 Leli .......................... H02K 9/04

FOREIGN PATENT DOCUMENTS

DE 102015217917 A1 3/2016
GB 2318458 A 4/1998

OTHER PUBLICATIONS

European Search Report dated Aug. 2, 2017 for European Patent Application No. 17171450.

* cited by examiner

ELECTRIC MOTOR HAVING A TANGENTIAL ARCHITECTURE WITH IMPROVED AIR COOLING

CROSS-REFERENCE TO RELATED APPLICATIONS

The present application claims priority to and all the benefits of Italian Patent Application No. 102016000055647, filed on May 30, 2016, which is hereby expressly incorporated herein by reference in its entirety.

BACKGROUND OF THE INVENTION

1. Field of the Invention

The present invention relates to an electric motor having a tangential architecture with improved air cooling.

2. Description of the Related Art

As is known, electric motors are provided with power electronics for their operation and control. The electronics, which comprise relative circuit boards, require a relative cooling. To such purpose many solutions are known in the art involving both liquid cooling solutions, typically water, and air cooling solutions.

Water cooling solutions permit increased heat dissipation but, on the other hand, entail higher costs, dimensions and weight. In addition, reliable hydraulic seals need to be provided of the cooling systems, to avoid possible leakages of coolant liquid.

Air cooling solutions are instead lighter, simpler and cheaper to make. In fact, they provide for fitting one or more fans on the rotor shaft of the electric motor. This way during the rotation of the rotor a flow of air is automatically generated which removes heat from the parts of the motor to be cooled.

Air cooling solutions entail some problems however due to their limited heat dissipation capacity compared to water. In fact, the gaseous medium, particularly air, has a reduced cooling capacity compared to a coolant liquid. In addition, the efficiency and cooling capacity of fans keyed onto the rotor shaft obviously depends on the speed of rotation of said shaft, in that the air flow generated depends directly on the speed of rotation of the rotor.

As a result, the efficiency and effectiveness of the cooling decreases when the rotation speed of the rotor is reduced. This limitation can entail major drawbacks, such as when the electric motor works under torque, at low rotation speed: in this operating mode, the electric motor would require a greater heat dissipation but due to the low rotation speed, the air flow generated is insufficient to provide adequate cooling.

It follows that when using electric motors with air cooling systems, it is essential to increase the efficiency of such systems as much as possible in order to ensure adequate cooling of the power electronics of the electric motor in all operating conditions. Otherwise, and especially when the power of the electric motor to be used increases, to date there is a tendency to switch to liquid refrigeration equipment which however has the above mentioned drawbacks, mainly linked to cost, space and size.

The above mentioned problems are further accentuated when electric motors having a tangential architecture have to be cooled, i.e. having power electronics, with relative electronic circuit boards, arranged tangentially to the cylindrical body of the stator. In fact, with this particular architecture, when air cooling systems are used major problems are encountered in conveying an adequate flow of air to the portions of the electric motor to be cooled. For these reasons, when using electric motors having a tangential architecture, it is preferred to use water cooling systems, with the limitations and drawbacks listed above.

SUMMARY OF THE INVENTION

The need is therefore felt to resolve the drawbacks and limitations mentioned with reference to the prior art.

As a result, the need is felt to provide an electric motor with air cooling which ensures adequate and efficient cooling in all operating conditions of the motor, even when the rotor rotates at full load and low speed.

Such need is satisfied by an electric motor having a tangential architecture including a rotor, rotating about an axis of rotation, and a stator, coaxial to the rotor with respect to said axis of rotation. The stator includes a casing which incorporates the rotor. A body incorporates a controller that controls the actuation, power supply and control of the electric machine. The body is placed outside the stator and parallel to the axis of rotation in a position substantially tangent to the casing of the stator. The rotor includes a first and second cooling fan, keyed on respective first and second axial ends of the rotor, opposite along the axis of rotation. The first and second cooling fan acting to generate respectively, with the rotation of the rotor, a first and a second flow of cooling air independent of each other. The first flow of cooling air is directed toward the first axial end of the rotor, and the second flow of cooling air is directed toward the body in order to cool down the controller.

Other objects, features and advantages of the present invention will be readily appreciated as the same becomes better understood after reading the subsequent description taken in connection with the accompanying drawings.

BRIEF DESCRIPTION OF THE DRAWINGS

The elements or parts of elements common to the embodiments described below will be indicated using the same reference numerals.

DETAILED DESCRIPTION OF THE INVENTION

With reference to the aforementioned figures, reference numeral 4 globally denotes a schematic overall view of an electric motor according to the present invention.

For the purposes of the scope of protection of the present invention, the specific type of electric motor is not relevant. As used herein, the term electric motor means any motor suitable to work as a driver and/or as a generator, of any size, shape or power.

The electric motor 4 comprises a rotor 8, rotating about an axis of rotation, X-X, and a stator 12 coaxial to the rotor 8 with respect to said rotation axis X-X. The stator 12 comprises a casing 16 which incorporates at least partially the rotor 8. The electric motor 4 further comprises a body 20 which incorporates controller for the operation, power supply and control of the electric motor 4. The controller, for the purposes of the present invention, may be of any type, size, and power.

The body 20 is arranged externally to the stator 12 and parallel to the axis of rotation X-X in a position substantially tangent to the casing 16 of the stator 12. It is from this specific positioning of the body 20, with its controller, with respect to the stator, that the term, electric motor having a tangential architecture, derives.

Advantageously, the rotor 8 comprises a first and a second cooling fan 24, 28, keyed on respective first and second axial ends 32, 36 of the rotor 8, opposite along said axis of rotation X-X.

The first and second cooling fans 24, 28 act to generate respectively, with the rotation of the rotor 8 with which they integrally rotate, a first and a second flow of cooling air independent of each other.

Specifically, the first flow of cooling air is directed toward the first axial end 32 of the rotor 8, and the second flow of cooling air is directed towards the body 20 so as to cool down the controller.

Preferably, said first and second cooling fans 24, 28 are radial fans which aspirate air in the axial direction A-A, substantially parallel to said axis of rotation X-X, and expel it in the radial direction R-R, substantially perpendicular to said axis of rotation X-X.

The casing 16 defines, near the first axial end 32, a first ventilation chamber 40 having at least one front opening 44 facing the first cooling fan 24, so that it aspirates air through the front opening 44, conveys it to the first ventilation chamber 40 to skim the first axial end 32 of the rotor 8 and expel it radially from at least one radial opening 48 placed near said first axial end 32.

The first ventilation chamber 40 is substantially fluidically isolated from a second ventilation chamber 52, defined by the casing 16 and housing the second axial end 32 of the rotor 8.

The casing 16 delimits, at the second axial end 36, the second ventilation chamber 52 housing the second cooling fan 28. The second ventilation chamber 52 is fluidically connected to a cooling channel 56 adjacent to the controller. This way, a flow of cooling air crossing the cooling channel 56 is able to remove heat from the controller.

Preferably, the cooling channel 56 extends along a main axial direction parallel to the axis of rotation X-X, between the first and second axial ends 32, 36 of the rotor 8.

According to one embodiment, the cooling channel 56 extends from an inlet mouth 60, placed on the side of the first axial end 32, to an outlet mouth 64 of the second ventilation chamber 52, so as to direct the second flow of cooling air flow from the first axial end 32 to the second ventilation chamber 52, skimming and thereby cooling, the controller.

Figure 1:
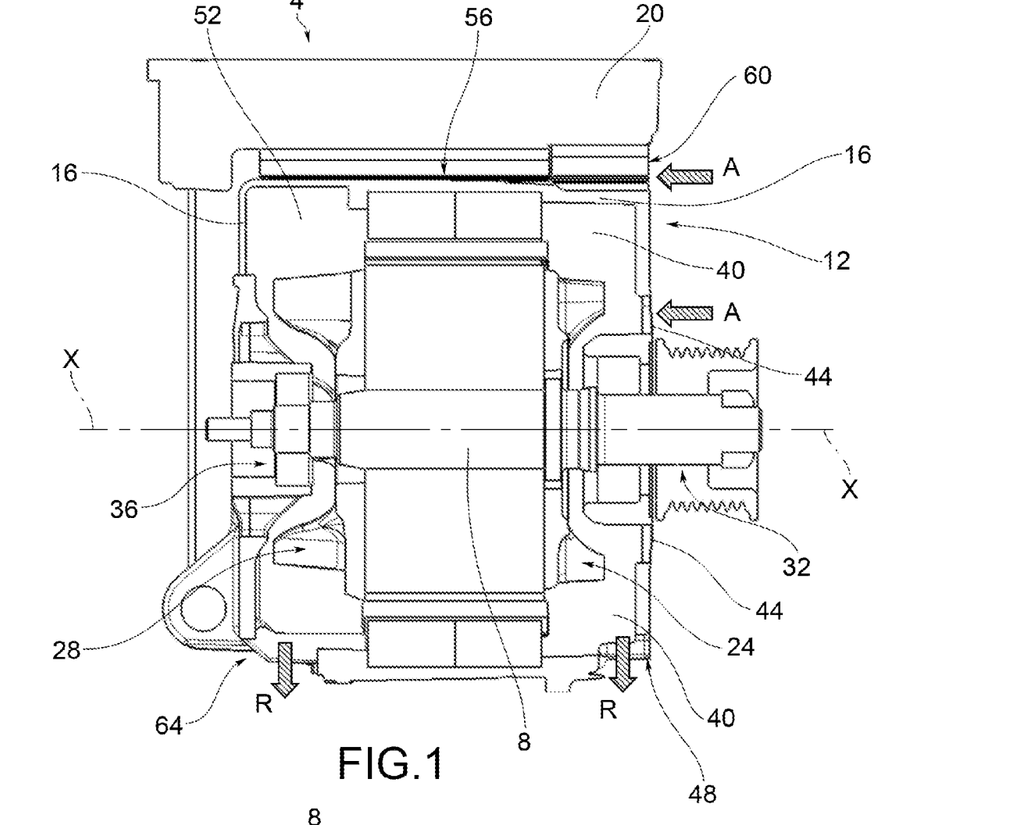
FIG. 1 is a cross-section view of an electric motor having a tangential architecture according to one embodiment of the present invention.
Figure 2:
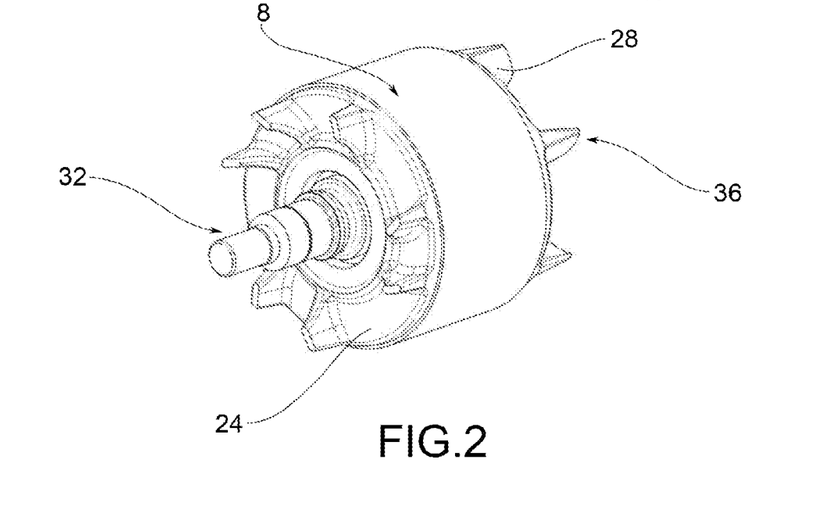
FIG. 2 is a perspective view of a rotor of the electric motor in FIG. 1.
Figure 3:
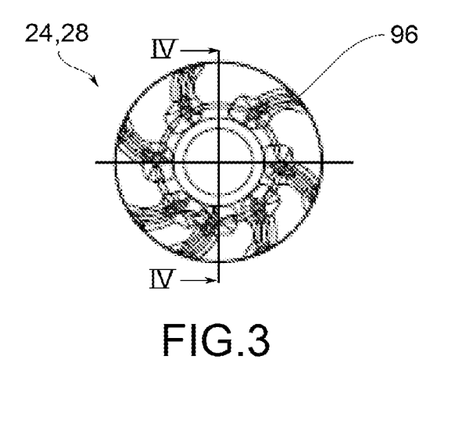
FIG. 3 is a front view of a cooling fan of an electric motor according to the present invention.
Figure 4:
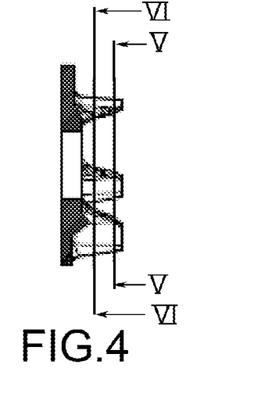
FIG. 4 is a cross-section view of the cooling fan in FIG. 3, along the cross-section plane IV-IV in FIG. 3.
Figure 5:
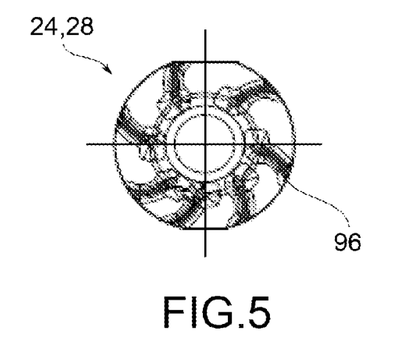
FIG. 5 is a cross-section view of the cooling fan in FIG. 3, along the cross-section plane V-V in FIG. 4.
Figure 6:
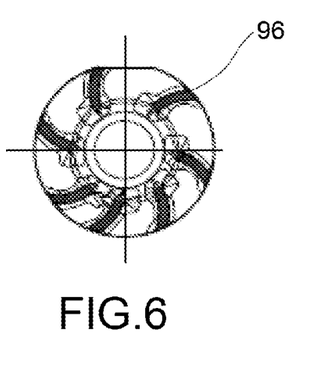
FIG. 6 is a cross-section view of the cooling fan in FIG. 3, along the cross-section plane VI-VI in FIG. 4.
Figure 7:
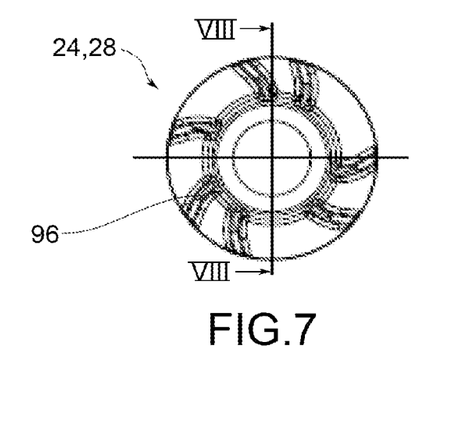
FIG. 7 is a front view of a cooling fan of an electric motor according to a further embodiment of the present invention.
Figure 8:
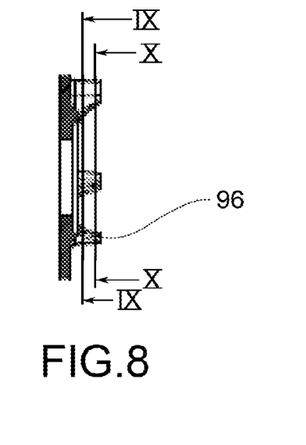
FIG. 8 is a cross-section view of the cooling fan in FIG. 7, along the cross-section plane VII-VII in FIG. 7.
Figure 9:
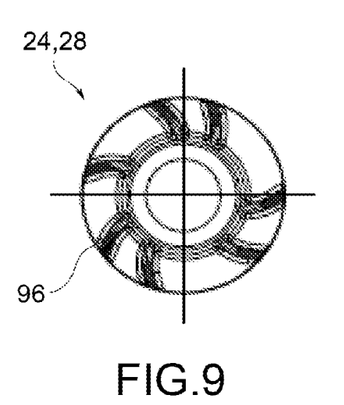
FIG. 9 is a cross-section view of the cooling fan in FIG. 7, along the cross-section plane IX-IX in FIG. 8.
Figure 10:
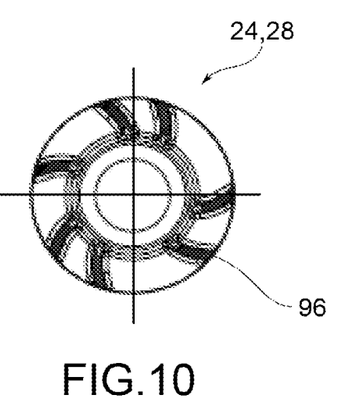
FIG. 10 is a cross-section view of the cooling fan in FIG. 7, along the cross-section plane X-X in FIG. 8.

According to a possible embodiment (FIG. 1) said inlet mouth 60 is oriented according to the main axial extension axis A-A, parallel to the axis of rotation X-X.

Figure 11:
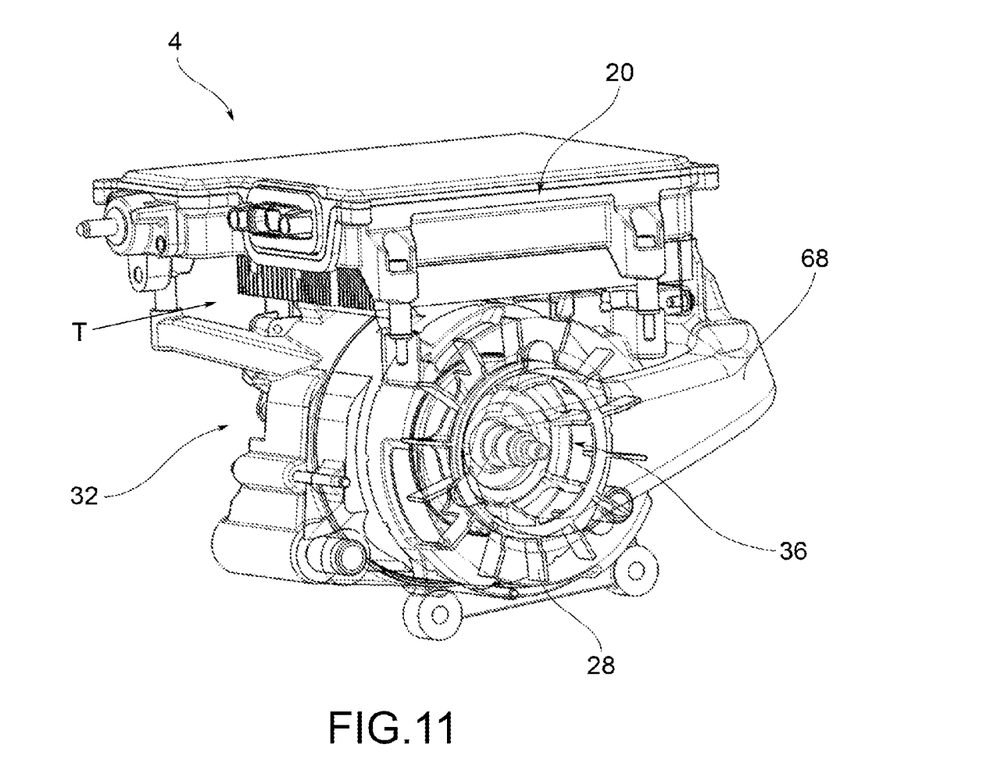
FIG. 11 is a perspective view of an electric motor having a tangential architecture according to a further embodiment of the present invention.
Figure 12:
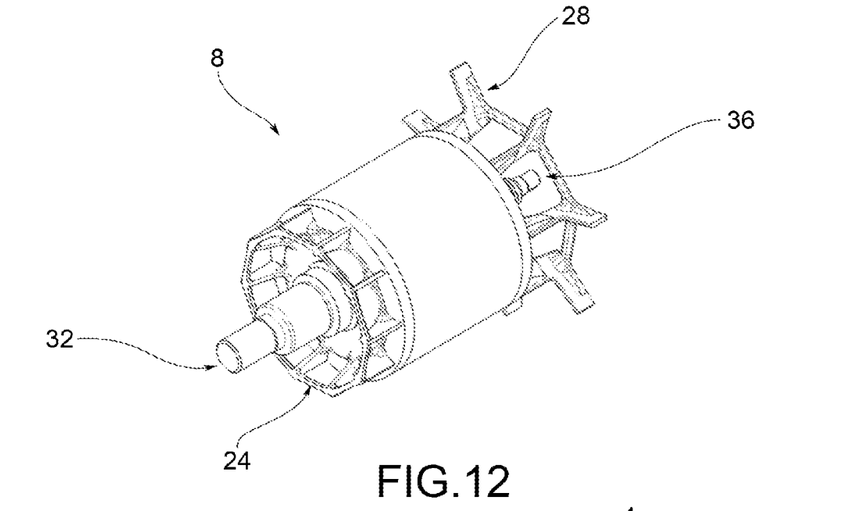
FIG. 12 is a perspective view of a rotor according to a further embodiment of the present invention.
Figure 13:
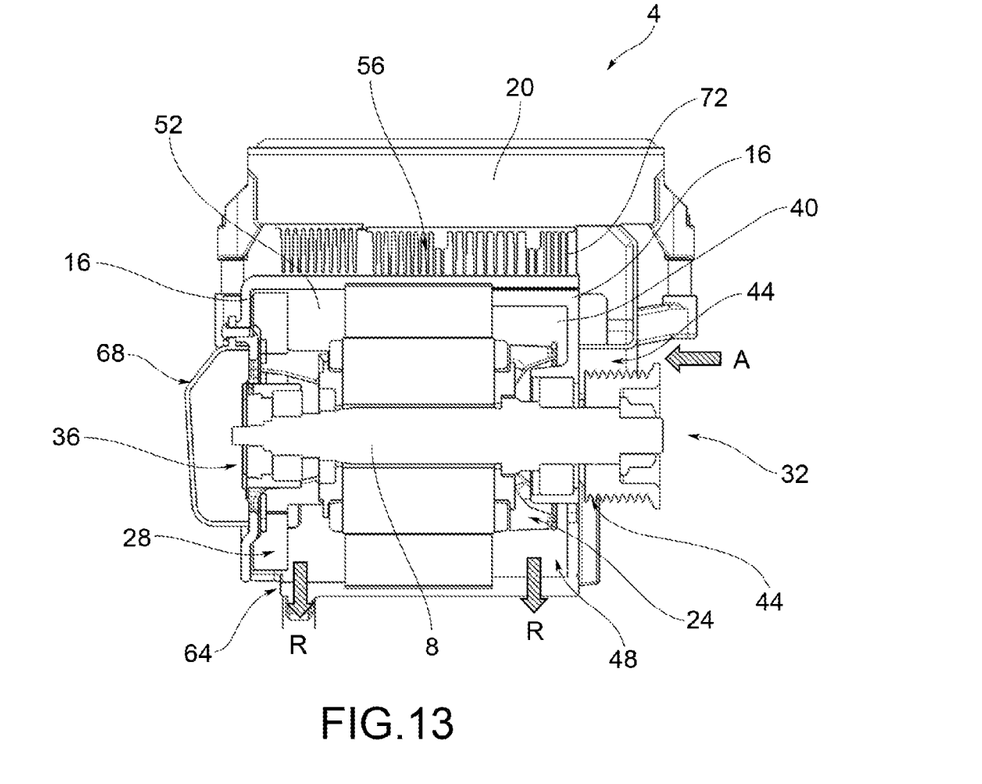
FIG. 13 is a cross-section view of the electric motor having a tangential architecture in FIG. 11.
Figure 14:
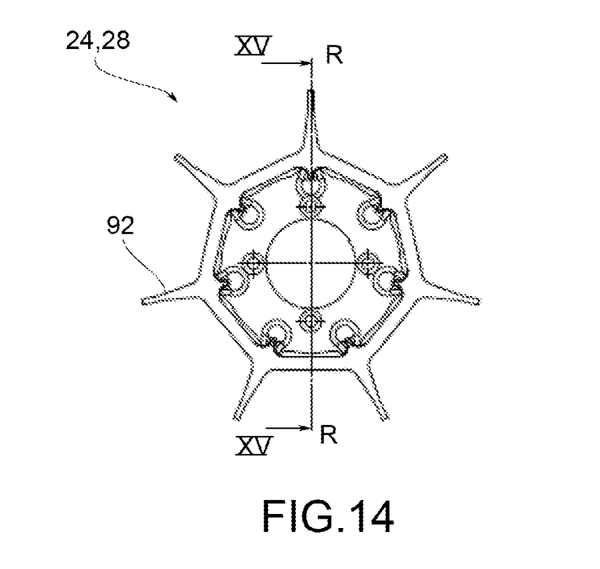
FIG. 14 is a front view of a cooling fan of an electric motor according to a further embodiment of the present invention.
Figure 15:
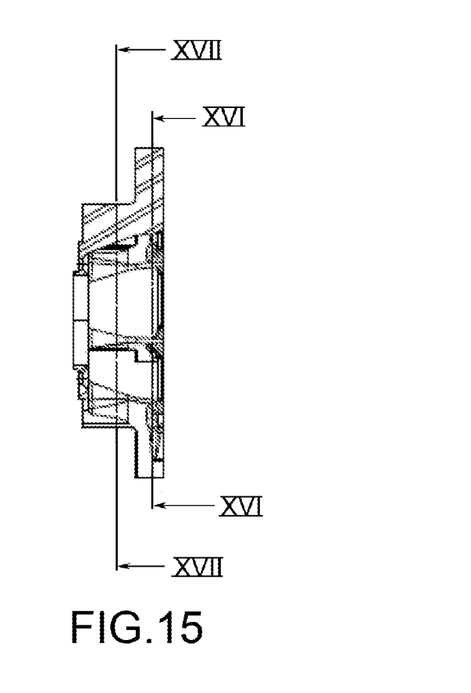
FIG. 15 is a cross-section view of the cooling fan in FIG. 14, along the cross-section plane XV-XV in FIG. 14.
Figure 16:
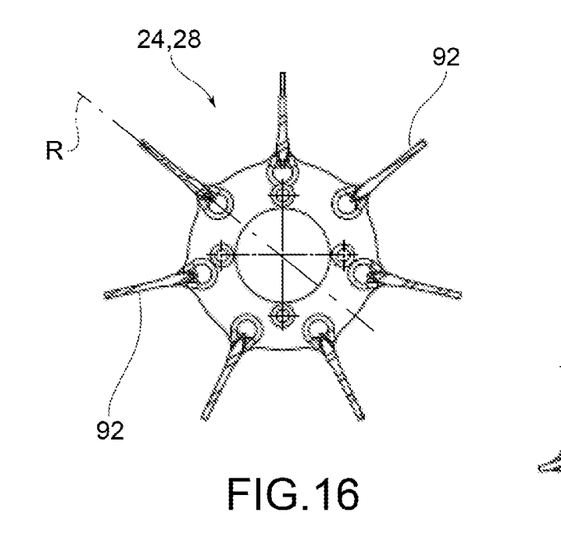
FIG. 16 is a cross-section view of the cooling fan in FIG. 14, along the cross-section plane XVI-XVI shown in FIG. 15.
Figure 17:
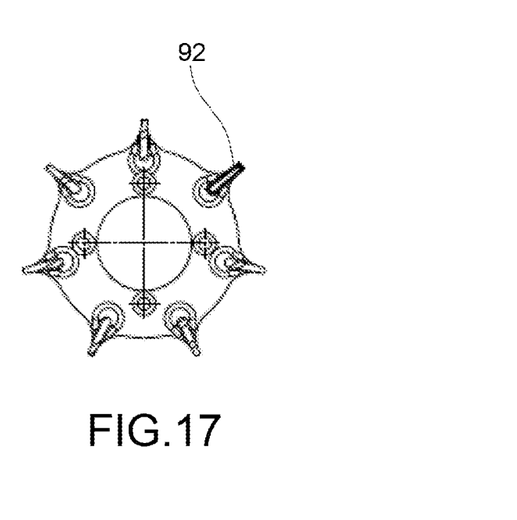
FIG. 17 is a cross-section view of the cooling fan in FIG. 14, along the cross-section plane XVII-XVII shown in FIG. 15.
Figure 18:
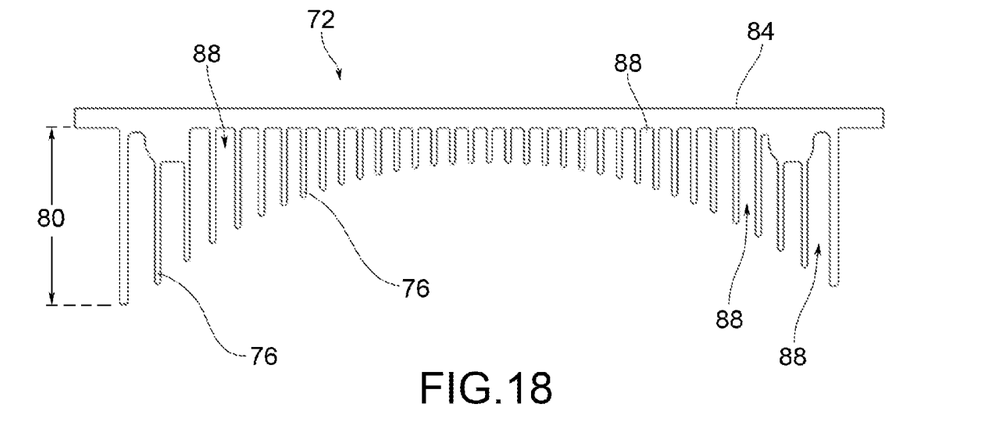
FIG. 18 is a side view of a heat sink finned element according to a possible embodiment of the present invention.

According to a further embodiment (FIGS. 11, 13) said inlet mouth 60 is oriented according to a main tangential extension axis T-T, perpendicular to the axis of rotation X-X and substantially tangent to the casing 16 of the stator 12.

The flow of cooling air crossing the cooling channel 56 can be conveyed towards the second ventilation chamber 52 by a suitable conveying channel 68.

The inlet mouth 60 is fluidically separate from the front opening 44 of the first ventilation chamber 40. This way the respective first and second flows of cooling air do not interfere with each other and do not create turbulence that could jeopardise the effectiveness of such flows and thus the efficiency of the cooling fans 24, 28.

Figure 19:
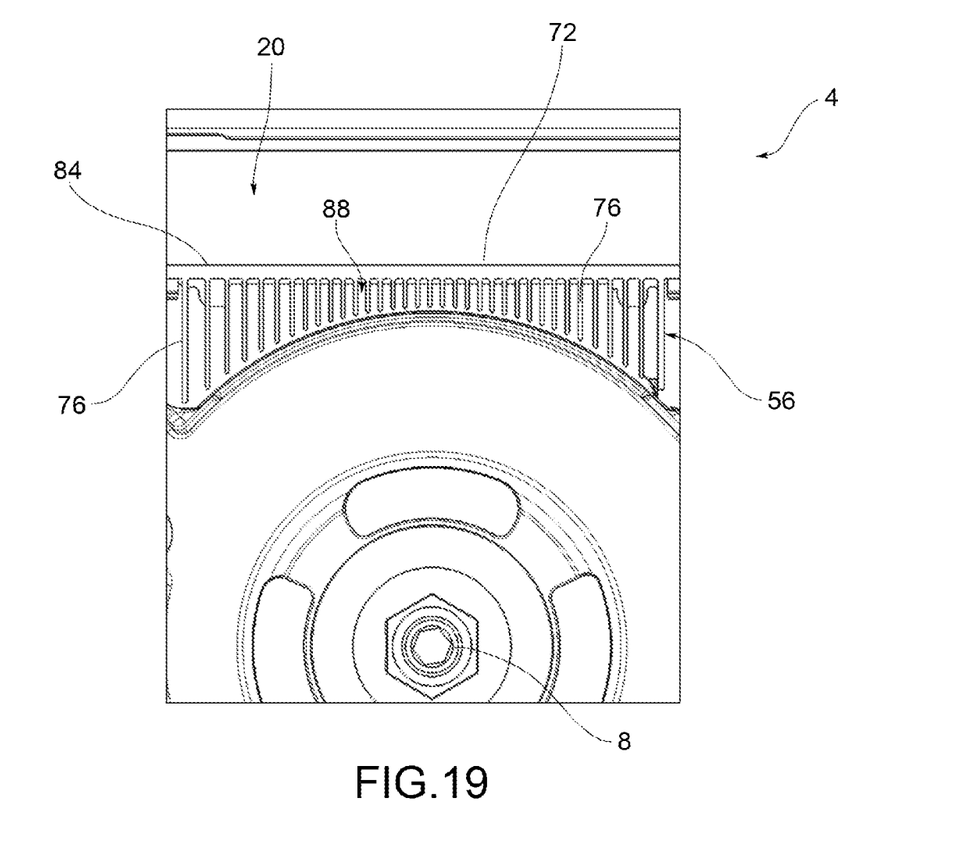
FIG. 19 is a front view of an electric motor having a tangential architecture comprising a heat sink finned element according to a possible embodiment of the present invention.

The cooling channel 56 may have various configurations; according to a possible embodiment, the cooling channel 56, with respect to a cross-section plane perpendicular to said axis of rotation X-X, presents a polygonal cross-section (FIG. 19) defined between the casing 16 of the stator 12, the body 20 and a pair of side walls.

Preferably, inside the cooling channel 46 at least one heat sink element with fins 72 is housed, fitted with a plurality of cooling fins 76 having a variable height 80 along the angular extension of the casing 16 of the stator 12, said height being defined by the distance between a support wall 84 of the body 20, connected to the controller and the casing 16 of the stator 12. The support wall 84 of the body 20 is connected to the controller, directly or through an interposed thermal conduction attachment in order to allow the flow of thermal energy from the controller towards the cooling fins 76, and thus towards the cooling channel 56.

The cooling fins 76 are separated from each other so as to divide the cooling channel 56 into a plurality of laminated type ventilation ducts 88, directed axially.

As regards the type of cooling fans keyed onto the rotor 8, according to a possible embodiment the first and/or second cooling fans 24, 28 comprise a plurality of straight radial blades 92, having a rectilinear radial cross-section passing through the axis of rotation X-X, with respect to a cross-section plane perpendicular to said axis of rotation X-X.

According to a further possible embodiment, the first and/or second cooling fans 24, 28 comprise a plurality of curved blades 96, having a curved cross-section with respect to a cross-section plane perpendicular to said axis of rotation X-X.

The operation of an electric motor according to the present invention will now be described.

In particular, the first cooling fan 24, for example placed on the side of a pulley, aspirates through appropriate front openings 44, conveys the aspirated air to the corresponding first axial end 32 of the rotor 8, which is thus cooled, and expels the air through radial openings 48. This flow of air is dedicated to cooling the first axial end 32 of the rotor-stator group of the electric motor 4.

The second cooling fan 28, similarly, aspirates and conveys the air through dedicated inlet mouths 60. Unlike the first flow of cooling air, the air thus aspirated axially crosses the entire electric motor 4, through the cooling channel 56 which houses the finned heat sink elements 72, appropriately shaped so as to mimic the external geometry of the engine.

The second flow of cooling air thus produced is functionally arranged both for cooling the power electronics, i.e. the controller and for cooling the remaining axial portion of rotor 8 and stator 12 of the electric motor 4: indeed, after cooling the power electronics, it reaches the second axial end 36 of the rotor 8 and escapes in the radial direction R through the outlet mouth 64.

The two flows of cooling air thus produced thereby constitute two air flows independent of one another, the functions of which are to cool certain portions of the electric motor 4, without the two flows influencing each other.

As may be appreciated from the description, the electric motor according to the invention makes it possible to overcome the drawbacks of the prior art.

In particular, the solution found adopts radial fans directly keyed onto the shaft so as to ensure a reliable solution of limited cost.

The two fans at opposite axial ends of the rotor generate cooling air flows independent of each other, each optimized to cool a corresponding portion of the electric motor.

This way it is possible to optimise each cooling air flow without it being influenced by the other. In other words, the independence of the two cooling air flows makes it possible to optimize each of the flows, preventing one from jeopardising or otherwise reducing the efficiency of the other, in all the operating conditions of the electric motor.

The specific provision and configuration of the fans allows effective air cooling in electric motors having a tangential architecture since it effectively cools both the power electronics and other parts of the rotor and the stator.

In particular, with regard to the power electronics, a specific cooling fan is used able to direct a flow of cooling air in a specific channel or meatus between the circuit board and the outer lateral surface of the stator, in a direction substantially tangential to the latter.

The use of specific cooling fins of the power electronics, at least partially counter-shaped to the outer surface of the stator, contributes synergistically to improving the cooling efficiency of the power electronics. In fact such conformation of the cooling fins makes it possible to exploit to the utmost the available space between the outer lateral surface of the rotor and the power electronics; this way, on the one hand the heat exchange surface available for the cooling fins is increased, and on the other the direction of the cooling flow generated by the specially provided fan for cooling the power electronics is delimited even better.

Furthermore, the present invention provides an air cooling system for electric motors which is especially lightweight and economical to make. In fact, the solution adopts radial fans directly keyed onto the rotor shaft, so as to ensure a reliable solution of limited cost. The use of an air cooling system also allows the use of pumps, pipes and related seals typical of liquid cooling systems to be avoided.

The invention has been described in an illustrative manner. It is to be understood that the terminology which has been used is intended to be in the nature of words of description rather than of limitation. Many modifications and variations of the invention are possible in light of the above teachings. Therefore, within the scope of the appended claims, the invention may be practiced other than as specifically described.

The invention claimed is:

1. An electric motor having a tangential architecture comprising:
   a rotor, rotating about an axis of rotation,
   a stator, coaxial to the rotor with respect to said axis of rotation,
   the stator comprising a casing which incorporates at least partially the rotor,
   a body which incorporates a controller that controls the actuation, power supply and control of the electric machine, the body being placed outside the stator and parallel to the axis of rotation in a position substantially tangent to the casing of the stator,
   wherein
   the rotor comprises a first and a second cooling fan, keyed on respective first and second axial ends of the rotor, opposite along said axis of rotation,
   said first and second cooling fan acting to generate respectively, with the rotation of the rotor, a first and a second flow of cooling air independent of each other,
   wherein the first flow of cooling air is directed toward the first axial end of the rotor,
   wherein the second flow of cooling air is directed toward the body in order to cool down the controller.

2. The electric motor having a tangential architecture as set forth in claim 1, wherein said first and second cooling fans are radial fans which aspirate air in the axial direction, substantially parallel to said axis of rotation, and expel it in the radial direction, substantially perpendicular to said axis of rotation.

3. The electric motor having a tangential architecture as set forth in claim 1, wherein the casing defines, near the first axial end, a first ventilation chamber having at least one front opening facing the first cooling fan, so that it aspirates air through the front opening, conveys it to the first ventilation chamber to skim the first axial end of the rotor and expel it radially at least one radial opening placed near said first axial end.

4. The electric motor having a tangential architecture as set forth in claim 3, wherein said first ventilation chamber is substantially fluidically isolated from a second ventilation chamber, defined by the casing and housing the second axial end of the rotor.

5. The electric motor having a tangential architecture as set forth in claim 3, wherein the casing defines, at the second axial end, a second ventilation chamber housing the second cooling fan, the second ventilation chamber being fluidically connected to a cooling channel adjacent to the controller.

6. The electric motor having a tangential architecture as set forth in claim 5, wherein the cooling channel extends along a main axial direction, parallel to the axis of rotation, between the first and second axial ends of the rotor.

7. The electric motor having a tangential architecture as set forth in claim 5, wherein the cooling channel extends from an inlet mouth, placed on the side of the first axial end, to an outlet mouth of the second ventilation chamber, so as to direct the second flow of cooling air from the first axial end to the second ventilation chamber, skimming the controller.

8. The electric motor having a tangential architecture as set forth in claim 7, wherein said inlet mouth is oriented according to the main axial extension axis, parallel to the axis of rotation.

9. The electric motor having a tangential architecture as set forth in claim 7, wherein said inlet mouth is oriented according to a main tangential extension axis, perpendicular to the axis of rotation and substantially tangent to the casing of the stator.

10. The electric motor having a tangential architecture as set forth in claim 7, wherein the inlet mouth is fluidically separate from the front opening of the first ventilation chamber.

11. The electric motor having a tangential architecture as set forth in claim 5, wherein the cooling channel, with respect to a cross-section plane perpendicular to said axis of rotation, presents a polygonal cross-section defined between the casing of the stator, the body and a pair of side walls.

12. The electric motor having a tangential architecture as set forth in claim 5, wherein inside the cooling channel at least one heat sink element with fins is housed, fitted with a plurality of cooling fins having a variable height along the angular extension of the casing of the stator, said height being defined by the distance between a support wall of the body, connected to the controller, and the casing of the stator.

13. The electric motor having a tangential architecture as set forth in claim 12, wherein said cooling fins are separated from each other so as to divide the cooling channel into a plurality of laminated type ventilation ducts, directed axially.

14. The electric motor having a tangential architecture as set forth in claim 1, wherein the first and/or second cooling fan comprise a plurality of straight radial blades, having a rectilinear radial cross-section passing through the axis of rotation, with respect to a cross-section plane perpendicular to said axis of rotation.

15. The electric motor having a tangential architecture as set forth in claim 1, wherein the first and/or second cooling fan comprise a plurality of curved blades, having a curved cross-section with respect to a cross-section plane perpendicular to said axis of rotation.

* * * * *